US010560987B2

(12) United States Patent
Franke et al.

(10) Patent No.: US 10,560,987 B2
(45) Date of Patent: Feb. 11, 2020

(54) ELECTRODE COMPOSITION

(71) Applicant: Rheinfelden Carbon GmbH & Co. KG, Rheinfelden (DE)

(72) Inventors: Alois J. Franke, Rheinfelden (DE); Robert Becker, Rheinfelden (DE); Johann Leye, Rheinfelden (DE)

(73) Assignee: RHEINFELDEN CARBON GMBH & CO. KG, Rheinfelden (DE)

( * ) Notice: Subject to any disclaimer, the term of this patent is extended or adjusted under 35 U.S.C. 154(b) by 0 days.

(21) Appl. No.: 16/089,020

(22) PCT Filed: Mar. 30, 2017

(86) PCT No.: PCT/EP2017/057507
§ 371 (c)(1),
(2) Date: Sep. 27, 2018

(87) PCT Pub. No.: WO2017/167859
PCT Pub. Date: Oct. 5, 2017

(65) Prior Publication Data
US 2019/0215918 A1    Jul. 11, 2019

(30) Foreign Application Priority Data
Mar. 31, 2016  (EP) .................................... 16163213

(51) Int. Cl.
| H05B 7/09 | (2006.01) |
| C04B 14/02 | (2006.01) |
| C04B 26/26 | (2006.01) |
| C25C 7/02 | (2006.01) |
| C04B 111/94 | (2006.01) |

(52) U.S. Cl.
CPC ............. H05B 7/09 (2013.01); C04B 14/024 (2013.01); C04B 26/26 (2013.01); C25C 7/025 (2013.01); C04B 2111/94 (2013.01)

(58) Field of Classification Search
CPC . C04B 2235/726; C04B 14/024; C04B 26/26; C08K 3/04; C02F 1/46109; H05B 7/085; H05B 7/09; C25C 7/025

USPC .... 373/88, 89; 252/502, 510, 506, 503, 511, 252/508, 182.1, 400.2, 507, 509; 264/105, 29.1, 29.5, 29.6, 29.7, 29.3, 6, 264/85, 115, 12, 122, 123, 125, 126, 13, 264/28, 29.4, 300, 486, 643, 658, 7; 204/294, 275.1, 284; 428/408, 367, 446, 428/448, 489, 698, 902

See application file for complete search history.

(56) References Cited

U.S. PATENT DOCUMENTS

| 3,352,776 | A | * | 11/1967 | Mason ................... | C10G 31/06 208/100 |
| 4,613,375 | A | * | 9/1986 | Forster ................... | C25C 3/125 106/284.05 |
| 5,978,410 | A | * | 11/1999 | Johansen ................. | H05B 7/09 373/89 |
| 6,749,678 | B1 | * | 6/2004 | Reynhout ............... | C04B 26/26 106/281.1 |
| 2015/0225296 | A1 | * | 8/2015 | Ruan ....................... | C04B 26/26 524/68 |
| 2017/0350027 | A1 | * | 12/2017 | Belbachir ............... | C04B 26/26 |

FOREIGN PATENT DOCUMENTS

| CN | 1047006 A | 11/1990 |
| CN | 101922021 A | 12/2010 |
| CN | 101928962 A | 12/2010 |
| EP | 0155230 B1 | 12/1987 |

* cited by examiner

*Primary Examiner* — Dana Ross
*Assistant Examiner* — Joe E Mills, Jr.
(74) *Attorney, Agent, or Firm* — The Webb Law Firm

(57) ABSTRACT

The present invention relates to a self-calcining electrode material for electric arc furnaces, containing one or more carbon components and a binder, wherein the binder is hard bitumen and having a needle penetration at 25° C. according to DIN EN 1426 of <50 [per 0.1 mm] and/or a softening point (ring and ball) according to DIN EN 1 427 of at least 65° C. and/or having a density at 25° C. according to DIN EN 52004 of 0.5 to 2 g/cm3, wherein the electrode material has a PAH content of <500 ppm. The hard bitumen is preferably derived by flash distillation from soft and medium-hard bitumen types and has a high sulfur content.

29 Claims, 1 Drawing Sheet

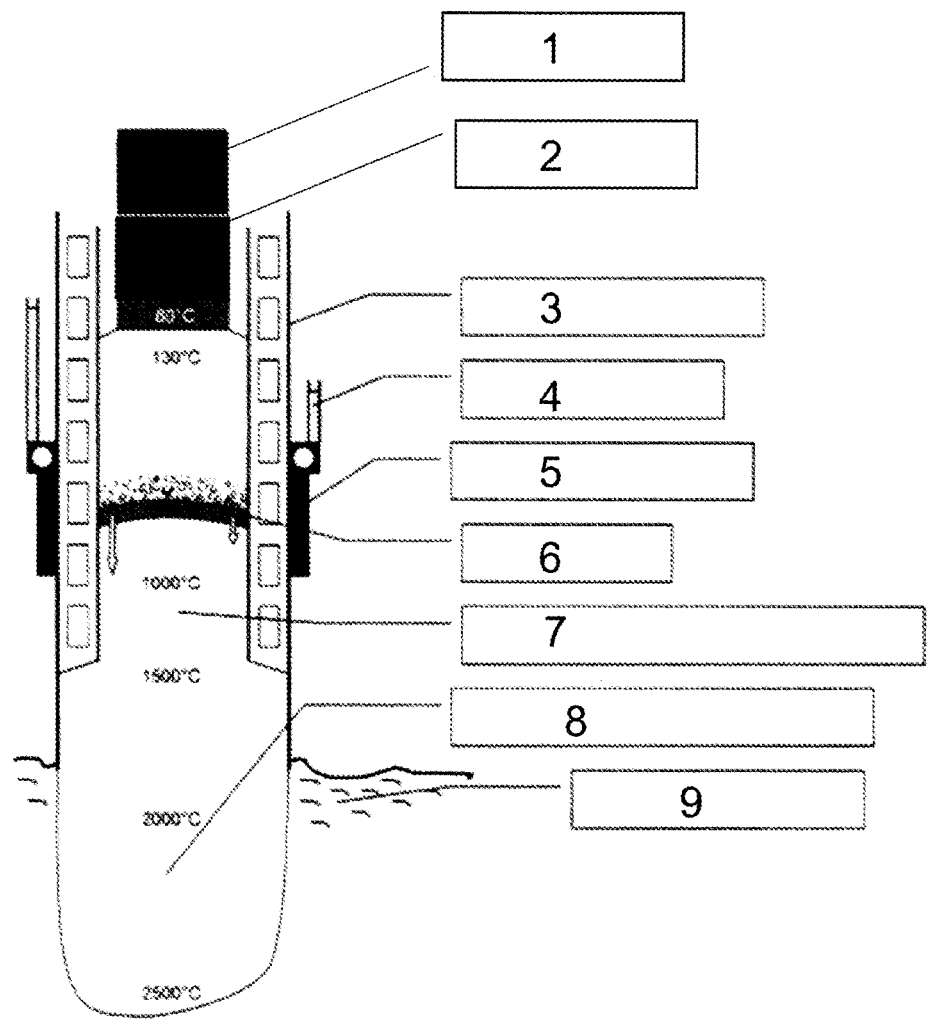
Prior Art

ELECTRODE COMPOSITION

TECHNICAL FIELD

The invention relates to a bituminous, self-calcining electrode composition for Söderberg electrodes of an electric arc furnace, and to a baked electrode produced from the self-calcining electrode composition.

PRIOR ART

The technology of the Söderberg electrodes dates back to the beginning of the 20$^{th}$ century. This electrode technology is used primarily in the field of aluminum fused-salt electrolysis and as Söderberg electrode in the electric arc furnace, for example in the smelting reduction furnace.

Self-baking or self-calcining electrodes, respectively, comprising the following technical principle, are to be understood under the term Söderberg electrode. An electrode composition (solid at room temperature) comprising carbon carriers, such as anthracite, petroleum coke, graphite and a coal tar pitch binder melts by process heat at 120-200° and forms a liquid to pasty composition, which fills the sheet-metal jacket and all cavities of the guide plates. Starting at about 500° C., the electrode composition transitions into the solid state and its electrical resistance decreases. The coke formed from the binder is present in amorphous form. The graphitization of the complete electrode starts at temperatures of greater than 1800° C.

The Söderberg electrode for smelting reduction furnaces comprises a sheet-metal jacket, wherein ribs (so-called guide sheets) are arranged on the inside of the sheet-metal jacket. The sheet-metal jacket is filled continuously with electrode composition, for example in the form of briquettes or in the form of blocks or cylinders. To extend the electrode during the operation, further sheet-metal jackets are welded on. The Söderberg electrode for smelting reduction furnaces for producing silicon metals is a special form of the Söderberg electrode without guide sheets, in the case of which a graphite electrode, so-called ELSA or composite electrodes, is guided inside the electrode composition. The energy input, which creates the baked and electrically conductive electrode from the electrode composition, results from the process heat of the furnace on the one hand and from the current passage on the other hand, which is introduced into the electrode via the contact jaws.

Coal tar pitch is used as binder in almost all of the electrode compositions, which are available on the market, for Söderberg electrodes for electric arc furnaces, because it has a high coke residue with excellent binder coke properties. In spite of its high contents of potentially harmful polycyclic aromatic hydrocarbons, coal tar pitch has established itself. All attempts of using non-toxic binders have failed to date.

With the background of replacing coal tar pitch as binder, the use of bitumen in the area of self-calcining anodes for the aluminum fused-salt electrolysis has been examined more closely in the middle of the 1980s. In contrast to coal tar pitch, bitumen contains polycyclic aromatic hydrocarbons in only extraordinarily small concentration, which is not harmful to health. For this purpose, an electrode composition for self-calcining electrodes is proposed in EP0155230A1, which, in addition to the normal constituents anthracite, graphite, petrol coke and pitch coke necessarily provides for a mixture of 70-90% by weight of hard bitumen and 10-30% by weight of soft bitumen as binder. It is expressly pointed out in EP0155230A1 that neither soft bitumen nor hard bitumen alone is suitable as binder for the carbon composition. The use of hard bitumen and soft bitumen alone was considered to be impractical.

Hard bitumen is to be understood as a bitumen comprising a softening point ring and ball of approximately 80-110° C., one of approximately 40-65° C. is to be understood as soft bitumen, wherein the density of the two bitumen varieties is not above 1.1 g/cm$^3$ (at 25° C.). As mentioned in EP0155230A1, bitumen is in fact considered to be an unsuitable binder for self-calcining electrodes due to its low coke residue of approximately 38% by weight, in contrast to coal tar pitch, which has approximately 50-60% by weight. In addition to the low coke residue, the bitumen has a high percentage of volatile constituents as compared to the coal tar pitch. In the aluminum fused-salt electrolysis, aluminum oxide is dissolved in molten cryolite and is converted to metallic aluminum at temperatures of around 960° C. in an electrolysis cell. The electrolysis is performed in steel tubs with carbon lining, the bottom of which simultaneously represents the cathode. The electrolyte and the molten aluminum are located in the tub. When using the self-calcining or self-baking anodes, respectively, electricity is supplied via vertical or horizontal electricity bars. The anode dips into the electrolyte. At the mentioned process temperature, the volatile constituents escape, in particular those of the used binder. The baked anode is thus characterized by a porous carbon body, which dips into the electrolysis bath. In practice, it was found that the anode becomes saturated with liquid electrolyte and is thus closed in a gas-tight manner. The inevitable escape of the volatile constituents through the molten composition further increases the porosity. The anodes became mechanically unstable and fell off the electricity bars. The attempts of replacing coal tar pitch as binder in Söderberg anodes were not pursued.

ILLUSTRATION OF THE INVENTION

It is the object of the present invention to develop a self-calcining electrode composition for the electric arc furnace, which does not have the disadvantages of known self-calcining electrode compositions.

According to the invention, the object is solved by means of a self-calcining electrode composition according to claim 1 as well as by means of a method according to claim 13.

A baked electrode produced from the self-calcining electrode composition according to the invention is further claimed in claim 12.

When reference is made below to electrode composition for Söderberg electrodes, this comprises Söderberg electrodes with and without graphite core.

"Electrode composition" is understood to be the composition of binder and carbon components and optional additives, which were formed or cast, respectively, or cut at the end of the mixing and kneading process into a mold of a different size, e.g. briquettes and cylinders, which is suitable for the intended use.

Baked electrode is to be understood to be the electrode in the already solid state, which is created starting at the so-called baking zone and in zones below this baking zone. This solid state occurs, when the originally solid electrode composition, which is present in a meterable starting material (briquettes and cylinders) is initially converted into a pasty composition and subsequently into a solid, freshly baked electrode.

The term "bitumen" used in this publication is to be understood to be a non-volatile mixture of different organic substances, which is obtained in response to the processing of crude oil, the viscoelastic behavior of which changes with the temperature (see also e.g. Römpp Chemical Dictionary, 9$^{th}$ corrected edition, Georg Thieme Verlag, Stuttgart, N.Y. and in particular in DIN 55946).

Only hard bitumen, which is obtained by additional flash distillation of soft and medium-hard bitumen products and which is characterized by a hard to brittle consistency, is suitable for the use according to the invention. The soft and medium-hard bitumens, in turn, are obtained as residue of a first distillation, which is performed under atmospheric pressure. The two consecutive distillation steps are also referred to as two-stage distillation.

The term "flash distillation" (also referred to as high vacuum distillation) used for the present use is understood to be the additional processing step of soft and medium-hard bitumen, which is performed under vacuum (e.g. 2 to 120 mm Hg) and increased temperature (e.g. 310 to 370° C.).

Hard bitumen, which is characterized by a high sulfur content preferably of 5-7%, and which is obtained from crude oil with a large amount of organically bonded sulfur, is in particular preferred for the present use.

This hard bitumen, which is suitable for the invention, further has a coke residue of 25-45%.

The applicants were surprised to find that the specific properties of the hard bitumen obtained according to the above selection criteria acted in a synergistic manner and are an excellent binder for arc furnaces for self-calcining electrode compositions and baked electrodes from this self-calcining electrode composition.

Due to the higher percentage of volatile constituents in the hard bitumen, which is suitable for the invention, as compared to conventional coal tar pitch-bonded compositions, a baked electrode results, which has a significantly higher porosity than a baked electrode, which includes coal tar pitch as binder. The mechanical properties with regard to the bending strength, the compressive strength and the static as well as dynamic e-module, are smaller than in the case of the conventional coal tar pitch-bonded electrodes. The high porosity of the baked electrode makes it easier to discharge the volatile gases into the furnace chamber of the electric arc furnace. A portion of the volatile constituents is converted into carbon with an effective binding by means of crack processes on the hot electrode carbon (1000-1500°). The high sulfur content of the hard bitumen promotes the cross-linking of this binder carbon and improves the elasticity of the electrode. The higher elasticity compensates the reduction of the mechanical strength.

The graphitization of the electrode following the baking occurs more quickly and already in a zone just below the contact jaws.

The hart bitumen, which is suitable for the self-calcining electrode composition (as well as for the present method), is preferably characterized by means of properties (which are favorable for the present application), such as softening temperature, needle penetration and/or density, obtained by the additional flash distillation.

Hard bitumen comprising:
(i) a needle penetration of <50 [per 0.1 mm], such as for example between 0 and 35 [per 0.1 mm], in particular 0 to 20 [per 0.1 mm], preferably 0 to 6 [per 0.1 mm] at 25° C. according to DIN EN 1426 and/or
(ii) a softening point (ring and ball) of at least 65° C., for example 65° C. to 160° C., in particular 80 to 110° C., preferably 85 to 100° C., according to DIN EN 1427; and/or
(iii) a density of 0.5 to 2 g/cm$^3$, preferably 1.0 to 1.2 g/cm$^3$, at 25° C. according to DIN EN 52004
is thus particularly suitable.

According to an embodiment, the hard bitumen has the penetration types 30/45 or 20/30, respectively (according to DIN EN 12591) or 10/15 (according to DIN EN 13305), respectively.

Hard bitumen, which is characterized by a combination of needle penetration of between 0 and 6 [per 0.1 mm] at 25° C. according to DIN EN 1426 and/or a softening point (ring and ball) of 85 to 100° C. according to DIN EN 1427 and/or a density of 1.0 to 1.2 g/cm$^3$ at 25° C. according to DIN EN 52004 is particularly preferred.

The amount of the hard bitumen used for the production of the electrode composition according to the invention is at most 35% by weight, preferably 15 to 30% by weight, more preferably 20 to 25% by weight, based on the electrode composition.

According to the present invention, self-calcining electrode compositions, which include one or more carbon components and a binder, are thus preferred for electric arc furnaces, characterized in that the binder only has hard bitumen with a needle penetration of <50 [per 0.1 mm] at 25° C. according to DIN EN 1426 and/or a softening point (ring and ball) of at least 65° C. according to DIN EN 1427, and/or with a density of 0.5-2 g/cm$^3$ at 25° C. according to DIN EN 52004 or one or more of the above-mentioned preferred ranges, respectively, and that the electrode composition has a PAC (polyaromatic hydrocarbon) content of <500 ppm.

The hard bitumen is preferably obtained by flash distillation of soft and medium-hard bitumen varieties.

Hard bitumen, which is characterized by a high sulfur content, preferably of 5-7% and which is obtained from crude oil with a high content of organically bonded sulfur, is in particular preferred for the present use. In addition to the hard bitumen, the self-calcining electrode composition according to the invention is produced with a dry mixture consisting of one or more carbon components, preferably coke and/or anthracite and/or graphite and optionally additives, such as, for example, sulfur, $CaF_2$, CaO and metal oxides such as $Fe_2O_3$, $Al_2O_3$.

The term coke is understood to be any conventional, commercially available coke product, such as for example petrol, needle and pitch coke, as well as low-ash metallurgical cokes. A coke with a grain structure of 0<x≤50 is to preferably be selected, preferably 0.2-25 mm. In a special embodiment, the coke is present in an amount of at most 60% by weight, based on the electrode composition. More preferably, the coke is present in an amount of 30 to 60% by weight, preferably 35 to 55% by weight, based on the electrode composition.

The term anthracite is understood to preferably be calcined anthracite, in particular electrically calcined or gas-calcined anthracite. In a preferred embodiment, gas-calcined anthracite is present in an amount of at most 60% by weight, based on the electrode composition. More preferably, gas-calcined anthracite is present in amount of 10% to 40% by weight, preferably 15 to 35% by weight, based on the electrode composition. In another preferred embodiment, electrically calcined anthracite is present in an amount of at most 80% by weight, based on the electrode composition. More preferably, electrically calcined anthracite is present in an amount of 65 to 80% by weight, preferably 70 to 75% by weight, based on the electrode composition.

The term graphite is in particular understood to be graphite powder or graphite, respectively, which was comminuted for example by means of braking and grinding. The term graphite further includes synthetic as well as natural graphites. The synthetic graphites can be produced both in a primary manner or also as originate from recycled graphite. Recycled graphite is to for example be understood to be electrode residues, which are prepared to the desired grain size for the production of the electrode composition.

Graphite is preferably used with a particle size in the range of 0.01 μm [micrometers] to 1 mm, preferably in the range of 1 to 300 μm [micrometers], most preferably in the range of 2 to 20 μm [micrometers].

The graphite is further also present in granular form. A preferred particle size range of the grains lies between 0<x≤50, preferably between 0.2-25 mm.

In a preferred embodiment, graphite is present in an amount of at most 25% by weight, based on the electrode composition. More preferably, graphite is present in an amount of 3 to 12% by weight, preferably 5 to 10% by weight, based on the electrode composition.

To produce the electrode composition according to the invention, the above components can have different grain sizes. In a preferred embodiment, the components coke, anthracite (gas-calcined or electrically calcined) and graphite have a grain size of between 0<x≤50, preferably 0.2-25 mm.

This hard bitumen, which is suitable for the invention, further has a coke residue of 25-45%.

In certain embodiments, based on gas-calcined anthracite, the self-calcining electrode compositions according to the invention thus preferably have
(i) 15-30% by weight, preferably 20-25% by weight, of hard bitumen and
(ii) 10-40% by weight, preferably 15-35% by weight, of gas-calcined anthracite.

These mixtures can additionally include at most 60% by weight, in particular 30-60% by weight, preferably 35-55% by weight, of coke as third component.

As alternative third component or as fourth component, these electrode compositions can further also include at most 15% by weight, in particular 3-12% by weight, preferably 5-10% by weight of graphite.

In other embodiments based on electrically calcined anthracite, the self-calcining electrode compositions preferably include
(i) 20-35% by weight, preferably 25-30% by weight, of hard bitumen and
(ii) 65-80% by weight, preferably 70-75% by weight, of electrically calcined anthracite.

Laboratory tests have shown that bituminous electrode composition after a calcination at around 1000° C., compared to coal tar pitch-bonded electrode compositions, have lower mechanical properties with regard to the bending strength, the compressive strength and the static as well as dynamic e-module. It was also shown that bituminous electrode compositions have a higher electrical resistance and a lower heat conductivity than coal tar pitch-bonded compositions. Under normal operating conditions in the electric arc furnace, corresponding mechanical stresses appear in the electrode body in response to the phase conversion of pasty to baked electrode compositions. A shrinking of the electrode body takes place in the temperature range between 500° C. and 1000° C., while an expansion is registered above 1000° C. The bituminous electrode composition leads to a baked electrode body with a higher porosity than for example a coal tar pitch-bonded composition. This higher porosity of the electrode body can, e.g., be used in an advantageous manner to discharge gases, which are created in response to the phase conversion of the electrode composition, and to minimize the appearing mechanical stresses.

An advantage, which is just as important, is that the electrode compositions according to the invention have much lower PAC contents, in particular <500 ppm, preferably <100 ppm as a result of the used bitumen, and toxic vapors and dust is not created in response to the use in the electric arc furnace.

In a preferred embodiment of the electrode composition according to the invention, the latter has a PAC content less than or 10 ppm, more preferably less than or 5 ppm, most preferably less than or 1 ppm, as a result of the used bitumen (which was preferably obtained by means of two-stage distillation).

The method according to the invention for producing self-calcining electrode compositions comprises the steps of braking, grinding and classifying the provided carbon components, such as coke, anthracite and/or graphite as well as optionally further additives in the specified amounts to a dry mixture, which is subsequently preheated and mixed to 120 to 200° C., preferably to 160-180° C. For adding to the dry mixture, the binder bitumen is heated to at least 30° C. above the softening point (softening point ring and ball according to DIN EN 12591). The processing of the dry mixture and bitumen binder takes place in batches or continuously in a mixer, for example a temperature-controlled, oscillating mixing and kneading screw, until the desired homogeneity is reached. The obtained mixture is shaped and cooled subsequently, either into briquettes or cylinders, blocks.

In a certain embodiment, the method according to the invention for producing a self-calcining electrode composition includes the steps of (i) mixing one or more carbon components, a binder and optionally additives, (ii) shaping the mixture into a predetermined shape, characterized in that exclusively hard bitumen (according to the above embodiment) is used as the binder with a needle penetration of 50 [per 0.1 mm] at 25° C. according to DIN EN 1426 and/or a softening point (ring and ball) of at least 65° C. according to DIN EN 1427, and/or with a density of 0.5 to 2 g/cm³ at 25° C. according to DIN EN 52004.

WAYS FOR CARRYING OUT THE INVENTION

FIG. 1 shows a self-calcining Söderberg electrode for an electric arc furnace in a sectional illustration according to the prior art in a highly simplified manner.

The temperature zones of a self-calcining Söderberg electrode are illustrated in FIG. 1 on the basis of a conventional coal tar pitch binder. The electrode composition 1, pressed into briquettes or cylinders, is supplied to a cylindrical housing 3 and is present in solid form in a zone 2, at a temperature of around 80° C. A power supply 4 is located on the outside of the housing. Electrical energy is supplied to the electrode composition via the contact jaw 5. The thermal energy output by the molten material 9 serves as further energy source. As a result of the energy input, the electrode composition obtains a pasty consistency at approximately 130° C. In the baking zone 6, between 500° C. and 1000° C., the volatile portions escape and the electrode composition transitions into a solid state. In zone 7, between 1000° C. and 1500° C., the carbon is present in amorphous form. In zone 8, above 2000° C., the graphitization occurs. The electrode composition, which is not yet baked, in the temperature range between 80° C. and around 500° C., is electrically non-conductive. The energy input takes place electrically via the electrical resistance of the electrode composition. Starting at around 500° C., the electrical resistance of the electrode composition decreases and it becomes electrically conductive. The graphitized electrode 8 is surrounded by a plasma or electric arc at the electrode tip (not visible in FIG. 1).

By using the bitumen, which is suitable for the invention, the graphitization of the electrode is already possible below the contact jaws.

EXAMPLE 1: "ELECTRODE COMPOSITION ANTHRACITE (GAS-CALCINED)"

A first example for a self-calcining electrode composition for electric arc furnaces has the following components: 22% of bitumen as binder; 28% of coke in the form of coke dust with a grain size fraction of $0<x\leq0.21$ mm; 2% of graphite in the form of graphite dust. Coke dust and graphite dust have a specific surface according to Blaine of 4500-6000 Blaine; 11% of a mixture of gas-calcined anthracite with coke in the mixing ratio of gas-calcined anthracite:coke=3:1 with a fine grain fraction of $0<x\leq0.84$ mm; 15% of a mixture of gas-calcined anthracite with coke in the mixing ratio of gas-calcined anthracite:coke=3:1 with an average grain fraction of 0.84-3.36 mm; 17% of a mixture of gas-calcined anthracite with coke in the mixing ratio of gas-calcined anthracite:coke=3:1 with a coarse grain fraction of 3.36-20 mm and 5% of graphite with a grain fraction between 1 and 25 mm.

In response to the production of the self-calcining electrode composition, the above-mentioned components as well as optionally further additives are broken, ground and classified. The obtained dry mixture is subsequently preheated to 120 to 200° C., preferably to 160-180° C., particularly preferably to 175° C. and is mixed at this temperature.

For the addition to the dry mixture, the binder bitumen is heated to 65° C. above the softening point (softening point ring and ball according to DIN EN 12591). The processing of the dry mixture and bitumen binder takes place in batches or continuously in a mixture, for example a temperature-controlled, oscillating mixing and kneading screw, until the desired homogeneity is reached. The obtained mixture is shaped and cooled subsequently, either into briquettes or cylinders, blocks.

EXAMPLE 2: "ELECTRODE COMPOSITION COKE"

A second example for a self-calcining electrode composition for electric arc furnaces has the following components: 24% of bitumen as binder; 28% of coke in the form of coke dust with a grain size fraction of $0<x\leq0.21$ mm; 3% of graphite in the form of graphite dust. Coke dust and graphite dust have a specific surface according to Blaine of 4500-6000 Blaine; 8% of coke with a fine grain fraction of $0<x\leq0.84$ mm; 17% of coke with an average grain fraction of 0.84-3.36 mm; 15% of gas-calcined anthracite with a coarse grain fraction of 3.36-20 mm and 5% of graphite with a grain fraction between 1-25 mm.

The above-listed components are mixed at a mixing temperature of 175° C.

In response to the production of the self-calcining electrode composition, the above-mentioned components as well as optionally further additives are broken, ground and classified. The obtained dry mixture is subsequently preheated to 120 to 200° C., preferably to 160-180° C., particularly preferably to 175° C. and is mixed at this temperature.

For the addition to the dry mixture, the binder bitumen is heated to 65° C. above the softening point (softening point ring and ball according to DIN EN 12591). The processing of the dry mixture and bitumen binder takes place in batches or continuously in a mixture, for example a temperature-controlled, oscillating mixing and kneading screw, until the desired homogeneity is reached. The obtained mixture is shaped and cooled subsequently, either into briquettes or cylinders, blocks.

EXAMPLE 3: ELECTRODE COMPOSITION ECA (ELECTRICALLY CALCINED ANTHRACITE)

A third example of a self-calcining electrode composition for electric arc furnaces has the following components: 26% of bitumen as binder; 35% of electrically calcined anthracite in the form of anthracite dust with a grain size fraction of $0<x\leq0.21$ mm and a specific surface according to Blaine of 4500-6000 Blaine; 5% of electrically calcined anthracite with a fine grain fraction of $0<x\leq0.84$ mm; 5% of electrically calcined anthracite with an average grain fraction of 0.84-3.36 mm, and 29% of electrically calcined anthracite with a coarse grain fraction of 3.36-20 mm.

Comparison of typical characteristic values of an electrode composition with coal tar pitch as binder and a bituminous electrode composition after the calcination at 1000° C. (laboratory test) according to the preceding second example:

| Properties | Electrode composition (bitumen) | Electrode composition (pitch) | Unit | Standard |
| --- | --- | --- | --- | --- |
| Calcined density | 1.40 | 1.49 | g/cm$^3$ | ISO 12985-1 |
| Electrical resistance | 105 | 70 | μΩm | DIN 51911 |
| Bending strength | 3 | 6 | MPa | ISO 51902 |
| e-module (static) | 0.7 | 1.2 | GPa | Rheinfelden method |
| e-module (dynamic) | 2.9 | 6.5 | GPa | Rheinfelden method |
| Compressive strength | 13 | 25 | MPa | ISO 18515 |
| Thermal conductivity | 2.2 | 2.6 | W/mK | Hot disk Method |
| Ash content | 2.5 | 2.5 | % | ISO 8005 |
| Benzo(a)pyrene | 0.01 | 3000 | ppm | DIN EN ISO 17993 |
| EPA 16 PAC | 0.1 | 25000 | ppm | DIN EN ISO 17993 |

Tests from the practice (sample collection from an electric arc furnace for the production of ferrosilicon) will be explained below. In these practical tests, an electrode composition according to the above-described second example was used, for which the laboratory test was conducted as well.

Using the bitumen, which is suitable for the invention, a baked electrode results, which shows the below-listed characteristic material values. The measured samples are cylindrical sample bodies from the baked electrode. They originate from an electric arc furnace for the production of ferrosilicon and were removed 20 cm below the contact jaws.

Analysis values of this bituminous electrode as compared to a coal tar pitch-bonded electrode are illustrated in the below table.

| Properties | Electrode 1 (bitumen) | Electrode 2 (pitch) | Unit | Standard |
|---|---|---|---|---|
| Calcined density | 1.42 | 1.59 | g/cm³ | ISO 12985-1 |
| Electrical resistance | 35 | 47 | μΩm | DIN 51911 |
| Bending strength | 3.2 | 7.5 | MPa | ISO 51902 |
| e-module (static) | 2.8 | 5.8 | GPa | Rheinfelden method |
| Compressive strength | 10 | 28 | MPa | ISO 18515 |
| Thermal conductivity | 31 | 16 | W/mK | Hot disk Method |

The differences between the laboratory values and the values, which originate from the production plant, are significant in particular in the case of the electrical resistance and prove the good baking behavior of the bituminous electrode, the improvement of the elastic deformability as well as an easy graphitization of the electrode.

The invention claimed is:

1. A self-calcining electrode composition for electric arc furnaces, comprising one or more carbon components and a binder,
   wherein the binder contains exclusively hard bitumen with a needle penetration of <50 per 0.1 mm at 25° C. according to DIN EN 1426, a softening point, ring and ball, of at least 65° C. according to DIN EN 1427, a density of 0.5 to 2 g/cm³ at 25° C. according to DIN EN 52004, or any combination thereof, and
   wherein the electrode composition has a polyaromatic hydrocarbon (PAC) content of <500 ppm.

2. The self-calcining electrode composition according to claim 1, wherein the hard bitumen has a high sulfur content of 5-7% and is obtained from crude oil containing a large amount of organically bound sulfur.

3. The self-calcining electrode composition according to claim 1, wherein the electrode composition has a PAC content less than or equal to 10 ppm.

4. The self-calcining electrode composition according to claim 1, wherein the electrode composition has a PAC content less than or equal to 5 ppm.

5. The self-calcining electrode composition according to claim 1, wherein the electrode composition has a PAC content of less than or equal to 1 ppm.

6. The self-calcining electrode composition according to claim 1, wherein the hard bitumen is present in an amount of at most 35% by weight, based on the electrode composition.

7. The self-calcining electrode composition according to claim 1, wherein the one or more carbon components are selected from anthracite, coke, graphite, and mixtures thereof.

8. The self-calcining electrode composition according to claim 4, wherein anthracite (a) is present as gas-calcined anthracite in an amount of at most 60% by weight, based on the electrode composition, or (b) is present as electrically calcined anthracite in an amount of at most 80% by weight, based on the electrode composition.

9. The self-calcining electrode composition according to claim 4, wherein coke is present in an amount of at most 60% by weight, based on the electrode composition.

10. The self-calcining electrode composition according to claim 4, wherein graphite is present in an amount of at most 15% by weight, based on the electrode composition.

11. A baked electrode comprising a sheet metal jacket and a baked electrode composition according to claim 1.

12. A method for producing a self-calcining electrode composition, comprising the steps of mixing one or more carbon components, a binder and optionally additives, shaping the mixture into a predetermined shape, wherein exclusively hard bitumen is used as the binder with a needle penetration of 50 per 0.1 mm at 25° C. according to DIN EN 1426, a softening point, ring and ball, of at least 65° C. according to DIN EN 1427, a density of 0.5 to 2 g/cm³ at 25° C. according to DIN EN 52004, or any combination thereof.

13. The method according to claim 12, wherein the hard bitumen is obtained by flash distillation of soft and medium-hard bitumen varieties.

14. The method according to claim 12, wherein the hard bitumen has a high sulfur content of 5-7% and is obtained from crude oil containing a large amount of organically bound sulfur.

15. The method according to claim 12, wherein the hard bitumen is present in an amount of at most 35% by weight, based on the electrode composition.

16. The method according to claim 12, wherein the one or more carbon components are selected from anthracite, coke, graphite, and mixtures thereof.

17. The method according to claim 12, wherein coke is present in an amount of at most 60% by weight, based on the electrode composition.

18. The method according to claim 12, wherein graphite is present in an amount of at most 25% by weight, based on the electrode composition.

19. The self-calcining electrode composition according claim 1, wherein the hard bitumen has a high sulfur content of 5-7%.

20. The self-calcining electrode composition according to claim 1, wherein the hard bitumen is present in an amount of 15% to 30% by weight, based on the electrode composition.

21. The self-calcining electrode composition according to claim 1, wherein the one or more carbon components are selected from the group consisting of gas-calcined anthracite, electrically calcined anthracite, coke, graphite and mixtures thereof.

22. The self-calcining electrode composition according to claim 4, wherein anthracite (a) is present as gas-calcined anthracite in an amount of 10% to 40% by weight, based on the electrode composition, or (b) is present as electrically calcined anthracite in an amount of 65% to 80% by weight, based on the electrode composition.

23. The self-calcining electrode composition according to claim 4, wherein coke is present in an amount of 30% to 60% by weight, based on the electrode composition.

24. The self-calcining electrode composition according to claim 4, wherein graphite is present in an amount of 3% to 12% by weight, based on the electrode composition.

25. The method according to claim 12, wherein the hard bitumen has a high sulfur content of 5-7%.

26. The method according to claim 12, wherein the hard bitumen is present in an amount of 15% to 30% by weight, based on the electrode composition.

27. The method according to claim 12, wherein the one or more carbon components are selected from the group consisting of gas-calcined anthracite, electrically calcined anthracite, coke, graphite and mixtures thereof.

28. The method according to claim 12, wherein coke is present in an amount of 30% to 60% by weight, based on the electrode composition.

29. The method according to claim 12, wherein graphite is present in an amount of 3% to 12% by weight, based on the electrode composition.

* * * * *

UNITED STATES PATENT AND TRADEMARK OFFICE
CERTIFICATE OF CORRECTION

PATENT NO. : 10,560,987 B2  
APPLICATION NO. : 16/089020  
DATED : February 11, 2020  
INVENTOR(S) : Alois J. Franke et al.

It is certified that error appears in the above-identified patent and that said Letters Patent is hereby corrected as shown below:

On the Title Page

Column 2, Item (57) ABSTRACT, Line 6, delete "1 427" and insert -- 1427 --

In the Specification

Column 1, Line 2, above "TECHNICAL FIELD" insert
-- CROSS-REFERENCE TO RELATED APPLICATIONS
This application is the United States national phase of International Application No. PCT/EP2017/057507 filed March 30, 2017, and claims priority to European Patent Application No. 16163213.8, filed March 31, 2016, the disclosures of each of which are hereby incorporated by reference in their entireties. --

In the Claims

Column 10, Line 32, Claim 19, after "according" insert -- to --

Signed and Sealed this
Second Day of June, 2020

Andrei Iancu
*Director of the United States Patent and Trademark Office*